United States Patent [19]

Tanaka

[11] Patent Number: 4,781,430
[45] Date of Patent: Nov. 1, 1988

[54] OPTICAL FIBER MATERIAL HAVING OPTICAL FIBER TIGHTLY HELD BY WRAPPING MATERIAL

[75] Inventor: Toshiyasu Tanaka, Yokohama, Japan

[73] Assignee: E. I. Du Pont de Nemours and Company, Wilmington, Del.

[21] Appl. No.: 724,751

[22] Filed: Apr. 18, 1985

[30] Foreign Application Priority Data

Apr. 19, 1984 [JP] Japan ................................. 59-77498
Nov. 22, 1984 [JP] Japan ............................. 59-220489

[51] Int. Cl.⁴ .............................................. G02B 6/36
[52] U.S. Cl. ............................. 350/96.20; 350/96.21
[58] Field of Search ............... 350/96.20, 96.21, 96.22, 350/96.23, 96.29, 96.30

[56] References Cited

U.S. PATENT DOCUMENTS

| | | | |
|---|---|---|---|
| 3,655,275 | 4/1972 | Seagreaves | 350/96.20 |
| 4,092,396 | 5/1978 | McCartney et al. | 264/249 |
| 4,211,470 | 7/1980 | Stewart | 350/96.21 |
| 4,217,084 | 8/1980 | Jacques et al. | 425/321 |
| 4,383,736 | 5/1983 | Forman | 350/96.21 |
| 4,447,121 | 5/1984 | Cooper et al. | 350/96.20 |
| 4,461,537 | 7/1984 | Raymer, II et al. | 350/96.20 |
| 4,497,536 | 2/1985 | Payne et al. | 350/96.21 |
| 4,519,672 | 5/1985 | Rogstadius | 350/96.20 |
| 4,693,550 | 9/1987 | Brown et al. | 350/96.20 |

FOREIGN PATENT DOCUMENTS

| | | |
|---|---|---|
| 220742 | 11/1957 | Australia . |
| 23113 | 12/1968 | Australia . |
| 70268 | 1/1976 | Australia . |
| 37083 | of 1984 | Australia . |
| 38423 | of 1985 | Australia . |
| 45887 | of 1985 | Australia . |
| 115512 | 7/1982 | Japan ................................. 350/96.2 |
| 144707 | 7/1985 | Japan ................................. 350/96.2 |

*Primary Examiner*—William L. Sikes
*Assistant Examiner*—Frank González

[57] ABSTRACT

An optical fiber material comprising at least one optical fiber and a wrapping material wrapping at least a part of the peripheral surface of the optical fiber in the axial direction of the optical fiber, wherein in its section taken at right angles to the axis of the optical fiber, the wrapping material holds the optical fiber tightly at its inside surfaces which face the optical fiber in the meridian direction of the optical fiber, or hold it tightly in at least three sites of its inner circumferential surface facing the optical fiber.

The present invention provide also processes and devices for preparation thereof.

16 Claims, 7 Drawing Sheets

OPTICAL FIBER MATERIAL HAVING OPTICAL FIBER TIGHTLY HELD BY WRAPPING MATERIAL

BACKGROUND OF THE INVENTION

1. Field of the Invention

This invention relates to an optical fiber material comprising an optical fiber and a wrapping material wrapping at least a part of the peripheral surface of the optical fiber in the axial direction of the optical fiber, a process for its production and a device or tool for its production.

2. Description of the Prior Art

Optical fibers made of such a material as quartz, multi-component glass or synthetic resins are known. Because of their generally very small diameter, they are susceptible to permanent deformation when undergoing a force exerted in a direction at right angles to the fiber axis. For example, optical fibers made of quartz or multi-component glass are liable to break, and those made of synthetic resins are liable to bend or break, under such a force.

Generally, the optical fibers are protected by flexible plastic primary coats to avoid permanent deformation (such as breaking or bending) during processing and handling or in the process of distribution to end users or to prevent them from becoming fragile upon being hydrolyzed by adhering water.

However, under conditions encountered in actual use where the optical fibers frequently undergo a relatively large external force, the above plastic primary coats are not so strong as to ensure accurate prevention of permanent deformation. Since such a plastic coat generally has a large clearance from the optical fiber, and a slip agent such as a silicone exists in the clearance, it cannot fix the optical fiber under a large force exerted in the axial direction of the fiber and permits the optical fiber to get out of place.

In protecting an optical fiber from a relatively large exterior force or fix it against an external force, it has been the previous practice to cover it with a ferrule. For example, an optical connector plug is produced by providing a ferrule having a passage formed by high-precision boring at its central part and an outer configuration conforming to the optical connector plug, inserting an optical fiber into the passage of the ferrule, and fixing it with an adhesive. The passage of the ferrule is bored with a high precision so that it conforms as much as possible to the outer configuration of the optical fiber. But for insertion of the optical fiber, the passage should be larger than the outside dimension of the optical fiber, and the use of an adhesive is essential to the fixation of the optical fiber.

The fixing of optical fibers by ferrules in the prior art has the defect that the use of adhesives complicates the process steps, a long period of time is required for the solidification of the adhesives, and the yield of the product is poor.

SUMMARY OF THE INVENTION

It is an object of this invention to provide optical fiber materials comprising an optical fiber and a wrapping material, the peripheral surface of the optical fiber being partly in contact with the inner circumferential surface of the wrapping material in tight fit.

Another object of this invention is to provide processes which can produce the optical fiber materials of this invention by a very simple operation in a high yield within a very short period of time.

Still another object of this invention is to provide press-bonding devices or tools for press-bonding a wrapping material to an optical fiber, which can be conveniently used in the production of the optical fiber materials of this invention by the processes of this invention.

Further objects and advantages of this invention will become apparent from the following description.

According to this invention, the above objects and advantages are achieved by a first optical fiber material comprising at least one optical fiber and a wrapping material wrapping at least a part of the peripheral surface of the optical fiber in the axial direction of the optical fiber, wherein in its section taken at right angles to the axis of the optical fiber, the wrapping material holds the optical fiber tightly at its inside surfaces which face the optical fiber in the meridian direction of the optical fiber, and at least one of said inside surfaces of the wrapping material has at least a minute space between it and the peripheral surface of the optical fiber in the equatorial direction.

According to this invention, the above objects and advantages of this invention are also achieved by a second optical fiber material comprising at least one optical fiber and a wrapping material wrapping at least a part of the peripheral material of the optical fiber in the axial direction of the optical fiber, wherein in its section taken at right angles to the axis of the optical fiber, the wrapping material holds the optical fiber tightly in at least three sites of its inner circumferential surface facing the optical fiber.

BRIEF DESCRIPTION OF THE ACCOMPANYING DRAWINGS

FIG. 4b is a schematic sectional view of the optical fiber material of this invention obtained by the process shown in FIG. 4a;

FIG. 9a is a sketch showing a pipe and in contact with it pressing surfaces having a gentle convex shape in the axial direction of the pipe;

FIG. 9b is a schematic view for explaining the deformation of the pipe and its passage by causing the pressing surfaces to approach further from the state shown in FIG. 9a;

DETAILED DESCRIPTION OF THE INVENTION

Figure 1:
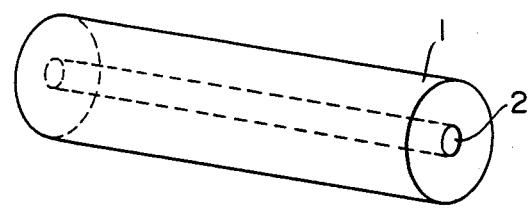
FIG. 1 is a perspective view of one example of a pipe used in this invention.

The first optical fiber material of this invention can be produced by a first process of this invention which comprises inserting an optical fiber into at least one hollow or slit-like passage formed in a pipe or rod made of a plastically deformable material, and applying a force at least partly to facing peripheral surfaces of the pipe or rod wrapping the optical fiber in the meridian direction of a section of the optical fiber and/or in a direction parallel to it, thereby tightly holding the optical fiber inserted in the hollow or slit-like passage.

The second optical fiber material of this invention can be produced by a second process of this invention which comprises inserting an optical fiber into at least one hollow or slit-like passage formed in a pipe or rod made of a plastically deformable material, and applying substantially equal forces directed toward the center of the pipe or rod to the peripheral surface of the pipe or rod in at least three sites on said peripheral surface in a section taken at right angles to the longitudinal direction of the pipe or rod, thereby tightly holding the optical fiber inserted in the hollow or slit-like passage.

The pipe or rod having a passage for insertion of optical fibers is made of a plasticially deformable material. The plastically deformable material is such that when a force is exerted on facing peripheral surfaces of the pipe or rod in accordance with the process of this invention, the aforesaid passage undergoes deformation and is kept deformed to an extent sufficient to hold the optical fiber tightly even after the applied force is removed. Examples of preferred plastically deformable materials are metals such as copper, zinc, lead and aluminum or alloys containing these metals (e.g., brass), and synthetic resins.

The pipe has at least one such hollow passage for insertion of an optical fiber, and the rod has at least one slit-like passage for insertion of an optical fiber. The outer shape of the pipe or rod may be any desired one, for example circular, elliptical or rectangular in sectional contour. The fiber inserting passage may be of any cross-sectional shape so long as it has a space for insertion or receiving of an optical fiber. For example, the hollow passage may have a circular, elliptical or rectangular cross-sectional shape, and the slit-like passage, a U-shaped cross-section.

Preferably, the pipe and rod have a circular or elliptical sectional contour; the hollow passage has a circular or elliptical cross section; and the slit-like passage has a U-shaped cross section. The hollow or slit-like passage for optical fiber insertion preferably has a smooth inside surface and extends smoothly toward its both ends in the longitudinal direction.

The wall thickness of the pipe or rod having an optical fiber insertion passage, which varies depending upon the material of which it is made, should be such that plastic deformation is generated in the passage when forces are applied to facing peripheral surfaces of the pipe or rod by the process of this invention. Specifically, the pipe or rod may have an average wall thickness (defined as a value obtained by subtracting the diameter of the contour, taken as circular, of the passage from the diameter of the contour, taken as circular, of the outside circumference) of about 0.1 mm to 2.5 mm. The pipe, in its section taken at right angles to its axial direction, may have a hollow passage having an average diameter of about 0.2 mm to about 4.8 mm, and the rod may have a slit width of, for example, about 0.03 mm to about 3 mm. The pipe and the rod may have a length of about 1 to about 100 mm.

The aforesaid average diameter means the diameter of the contour of the passage which is taken as a circular contour.

According to the process of this invention, an optical fiber is first inserted into the hollow or slitlike passage of the pipe or rod described above. The passage can be formed in such a dimension that the optical fiber can be inserted into it with ample allowance for subsequent deformation. Hence, this can minimize the occurrence of an accident of breakage of the fine optical fiber during insertion.

Preferably, the average diameter of the hollow passage of the pipe or the maximum width of the slit of the slit-like passage of the rod is about 1.001 to 60 times the diameter of the optical fiber to be inserted into the passage.

According to the invention, a force is then applied to the pipe or rod in which the optical fiber is inserted.

According to the first process of this invention, the force should be applied at least partly to peripheral surfaces of the pipe or rod wrapping the optical fiber which face each other in the meridian direction in a section of the optical fiber or in a direction parallel to it.

According to the second process, forces directed toward the central part of the pipe or rod should be applied at least partly to the peripheral surface of the pipe or rod in at least three sites of the peripheral surface of the pipe or rod in a section of the optical fiber taken at right angles to its longitudinal direction.

The first process of the invention will be first described, and then the second process.

It should be understood that in the first process, the meridian direction in the section of the optical fiber is a phantom line passing through the center of the section of the optical fiber. Accordingly, when a force is applied to the pipe or rod in the meridian direction in the section of the optical fiber, two quite oppositely directed forces of quite the same magnitude are applied to the pipe or rod at two sites of its peripheral surface which are deviated from each other just by 180° in one direction passing through the center of the section of the optical fiber. When a force is applied to the pipe or rod in a direction parallel to the meridian direction, two quite oppositely directed forces of quite the same magnitude are applied to the pipe or rod at two sites of its peripheral surface which are deviated from each other by 180° in one direction not passing through the center of the section of the fiber but being parallel to the direction passing through the center of the section. Application of forces in the manner described above is very important to the first process of this invention.

When forces are applied by the first process of this invention to the pipe or rod in which the optical fiber is inserted, the hollow or slit-like passage is deformed inwardly thereof in the directions in which the forces are applied, and the optical fiber inserted in the passage is held tightly. Deformation of the passage should be carried out at least until two facing inner surfaces of the passage in the meridian direction of the optical fiber make contact with the outside surface of the optical fiber. The deformation may be continued further until facing inner surfaces of the passage in a direction parallel to the meridian direction make contact with each other.

In the second process of this invention, forces to be exerted to at least three sites should substantially be equal to each other.

Preferably, the three or more sites on the peripheral surface of the pipe or rod on which such forces are exerted are substantially symmetrical to each other with respect to the axis of the pipe or rod in a section taken at right angles to the longitudinal direction of the pipe or rod. In one specific example of such a relation, a polygon formed by connecting the three or more sites is a regular polygon. For example, sites forming a regular triangle are symmetrical with each other with respect to a 120° axis, and four sites forming a square are symmetrical to each other with respect to a 90° rotating axis. It will be understood that likewise, sites forming a regular polygon with n sides are symmetrical to each other with respect to a (360/n) degree rotating axis.

It can also be said that four or more evennumbered sites forming a polygon having even-numbered sides and a 180° rotating axis of symmetry, such as a rectangle and a hexagon, are also axially symmetrical.

When forces are exerted by the second process of this invention as described above on the pipe or rod having an optical fiber inserted in its passage, the hollow or slit-like passage is deformed inwardly thereof in the directions in which the forces are applied, and finally the inserted optical fiber is held tightly. Deformation of the passage should be carried out at least until the inside surface of the passage facing the optical fiber makes contact with the outside surface of the optical fiber. It can further be continued until the inside surface of the passage makes contact with itself at least partly.

In the first and second processes, the forces applied may be adjusted to about 1 to 800 kg per $mm^2$ of that area of the peripheral surface of the pipe or rod which finally undergoes load, preferably about 10 to 500 $kg/mm^2$, more preferably 50 to 300 $kg/mm^2$.

The forces are exerted wholly or partly in the axial direction on the peripheral surface of the pipe or rod which wraps and faces the optical fiber. In other words, the pipe or rod can be deformed wholly in the axial direction by applying forces to its facing peripheral surfaces wholly in the axial direction. Or the peripheral surface of the pipe or rod may be deformed partly in the axial direction, for example only centrally, by applying a force to its peripheral surface partly in the axial direction, for example only at its central portion in the axial direction.

According to the latter method of deforming only the central part of the pipe or rod in the axial direction, the optical fiber can be positioned nearly at the central part of the non-deformed end portions of the pipe or rod (the central part of the passage in an axial section). Furthermore, according to the latter method of applying a force to only a part of the pipe or rod in the axial direction, the force can be intermittently exerted on the pipe or rod. In this case, therefore, a nondeformed site can be left which relaxes strain in the axial direction generated in the pipe or rod upon deformation. When the pipe or rod is relatively long, it is desirable to apply forces intermittently as stated above.

Forces upon at least a part of the peripheral surface of the pipe or rod can be exerted axially of the pipe or rod either simultaneously or separately at different times. Specifically, the forces can be applied to the peripheral surface of the pipe or rod by bringing those sites of the pipe or rod to which forces are to be applied into contact with the pressing surfaces of a force exerting device in the axial direction of the pipe or rod either simultaneously or gradually, for example first at the central part of the pipe or rod and then gradually toward its both end portions. Forces to be applied to the peripheral surface of the pipe or rod at least partly are preferably controlled such that a force upon the central part of its peripheral surface in the axial direction is exerted earlier than forces upon both end portion of the peripheral surface. As a result of this control, axial strain generated in the pipe or rod upon deformation can be directed from its central part toward its both end portions, and the breaking of the optical fiber can be prevented. Hence, the process of the invention can be carried out advantageously.

In the process of this invention, that part of the optical fiber which projects slightly from one end portion of the wrapping material before or after holding the optical fiber tightly by applying forces may be melted under heat to form a convex surface in that part of the optical fiber, for example a curved surface in the form of a convex lens, an ellipse or a sphere, at the end portion of the wrapping material. This convex surface is like that of a liquid which is formed at the end of a capillary. The formation of the convex surface has the advantage that light can be transmitted or received effectively from the end portion of the optical fiber without polishing this end portion.

According to this invention, the first process can be easily performed by using a first pressing device having two pressing surfaces at least one of which is movable in the meridian direction of an optical fiber or in a direction parallel to it. The first pressing device is adapted to apply forces at least partly to facing peripheral surfaces of a wrapping material, i.e. a pipe or a rod, wrapping at least a part of the peripheral surface of the optical fiber along the axis of the optical fiber and having a passage for insertion of the optical fiber therein in the meridian direction of the optical fiber or a direction parallel to it.

According to this invention, the second process can be easily performed by using a second pressing device having at least three pressing surfaces at least one of which is movable in a direction passing through the central part of an optical fiber. The second pressing device is adapted to apply forces at least partly to the peripheral surface of a wrapping material, i.e. a pipe or rod, wrapping at least a part of the peripheral surface of the optical fiber along the axis of the optical fiber and having a passage for insertion of the optical fiber therein in the direction passing through the central part of the optical fiber.

The first and second pressing devices will be described below.

The first pressing device has two pressing surfaces at least one of which is movable in such a manner that the two approach each other.

The two pressing surfaces are movable so as to approach each other on a common phantom axis. These pressing surfaces have such a surface shape as to generate oppositely directed forces of quite the same magnitude on facing peripheral surfaces of the pipe or rod when pressing these peripheral surfaces. For example, two pressing surfaces having substantially perpendicular flat shapes with respect to the phantom axis, or two pressing surfaces having a narrow groove along the axis of the pipe or rod in flat surface shapes may be used as the pressing surfaces of the first pressing device. Investigations of the present inventor have shown that an especially preferred pressing surface is constructed such that the central portion, taken in the axial direction of the optical fiber, of that part of the pressing surface which is to make contact finally with the wrapping material can exerts a force on the wrapping material earlier than the end portions of that part. In such an especially preferred pressing surface, the central portion of the part to be finally contacted with the wrapping material is gently curved, for example slightly bulged as compared with its end portions in a direction in which the pressing surface abuts against the wrapping material.

Thus, according to this invention, there is provided a first press-bonding device or tool for producing the first optical fiber material comprising an optical fiber and a wrapping material having a passage for insertion of the optical fiber therein and wrapping at least a part of the peripheral surface of the optical fiber along the axis of the optical fiber, said device or tool comprising a pressing member having two pressing surfaces at least one of which is movable in the meridian direction of the optical fiber or a direction parallel thereto, said pressing member being capable of applying forces at least partly to facing peripheral surface of the wrapping material in said meridian direction or said parallel direction, each of the two pressing surfaces of the pressing member which are to abut against the wrapping material being constructed such that the central portion, taken in the axial direction of the optical fiber, of that part of each pressing surface which is to make contact finally with the wrapping material can apply a force to the wrapping material earlier than the end portions of that part.

As stated above, the second pressing device has at least three pressing surfaces at least one of which can move in a direction passing through the central part of the optical fiber.

The three or more pressing surfaces in the second pressing device can move toward the central part of the optical fiber so as to approach each other. Furthermore, they have such a surface shape that when they press the peripheral surface of the pipe or rod, forces of quite the same magnitude are generated on the peripheral surface. For example, at least three pressing surfaces having flat shapes substantially perpendicular to a phantom axis passing through the central part of the optical fiber, or at least three pressing surfaces having narrow grooves lying along the axial direction of the pipe or rod in a flat surface shape may be used as the pressing surfaces of the second pressing device. Investigations of the present inventor have shown that an especially preferred pressing surface is constructed such that the central portion, taken in the axial direction of the optical fiber, of that part of the pressing surface which is to make contact finally with the wrapping material in the axis of the optical fiber can exert a force on the wrapping material earlier than the end portions of that part. In such a preferred pressing surface, the central portion of that part which is to make contact finally with the wrapping material is gently curved, for example slightly bulged as compared with its end portions in a direction in which the pressing surface abuts against the wrapping material.

Thus, according to this invention, there is provided a second press-bonding device or tool for producing the second optical fiber material comprising an optical fiber and a wrapping material having a passage for insertion of the optical fiber therein and wrapping at least a part of the peripheral surface of the optical fiber along the axis of the optical fiber, said device or tool comprising a pressing member having at least three pressing surfaces at least one of which is movable in a direction passing through the central part of the optical fiber, said pressing member being capable of applying forces at least partly to the peripheral surface of the wrapping material in said direction passing through the central part of the optical fiber, each of said at least three pressing surfaces being constructed such that the central portion, taken in the axial direction of the optical fiber, of that part of each pressing surface which is to make contact finally with the wrapping material can exert a force on the wrapping material earlier than the end portions of that part.

It will be understood therefore that by using the first process and the first press-bonding device or tool, there is provided the first optical fiber material of this invention comprising at least one optical fiber and a wrapping material wrapping at least a part of the peripheral surface of the optical fiber in the axial direction of the optical fiber, wherein in its section taken at right angles to the axis of the optical fiber, the wrapping material holds the optical fiber tightly at its inside surfaces which face the optical fiber in the meridian direction of the optical fiber, and at least one of said inside surfaces of the wrapping material has at least a minute space between it and the peripheral surface of the optical fiber in the equatorial direction.

The first optical fiber material of this invention is characterized by the structure of its section taken at right angles to the axis of the optical fiber. In this section, the inside surfaces of the wrapping material facing the optical fiber are in intimate contact with the optical fiber in tight fit in the meridian direction of the optical fiber, and in the equatorial direction (the direction passing through the center of the optical fiber), at least one of the inner surfaces of the wrapping material has at least a minute space between it and the peripheral surface of the optical fiber. In other words, in a cross section of the first optical fiber material of this invention, the wrapping material having two surfaces in intimate contact with the optical fiber in a direction passing through the center of the optical fiber and a surface not in contact with the optical fiber in a direction crossing the aforesaid direction exists together with the optical fiber.

The first optical fiber material of this invention having a space in the equatorial direction can be said to be characteristic in that the optical fiber is strongly and elastically wrapped by the wrapping material owing to the spring action of the inside surfaces of the wrapping material defining the space.

The number, size and shape of such spaces present in the equatorial direction vary depending upon the material and type of the wrapping material, the shape of the passage of the wrapping material, and the degree of deformation of the passage. For example, the optical fiber material of this invention may have two spaces of a substantially similar shape at opposite positions in the equatorial direction. One of the spaces may have a sectional area about 0.001 to about 150 times, preferably about 0.001 to about 75 times, more preferably about 0.1 to about 10 times, that of the optical fiber.

It will be likewise understood that according to this invention, by using the second process and the second press-bonding device or tool, there can be provided the second optical fiber material of this invention comprising at least one optical fiber and a wrapping material wrapping at least a part of the peripheral surface of the optical fiber in the axial direction of the optical fiber, wherein in its section taken at right angles to the axis of the optical fiber, the wrapping material holds the optical fiber tightly in at least three sites of its inner circumferential surface facing the optical fiber.

The second optical fiber material of this invention is also characterized by the structure of its section taken at right angles to the axis of the optical fiber. In the aforesaid section of the second optical fiber material of this invention, the inner circumferential surface of the wrapping material which faces the optical fiber is in intimate and tight contact with the optical fiber in at least three sites. The second optical fiber material of this invention is also characterized by the fact that it has a plurality of pressed sites on its peripheral surface, and in its section taken at right angles to the axis of the optical fiber, at least three minute spaces exist between the inner circumferential surface of the wrapping material and the peripheral surface of the optical fiber.

The number, size and shape of such spaces vary depending upon the material and type of the wrapping material, the shape of the passage of the wrapping material, the history of pressing, or the degree of deformation of the passage. For example, the second optical fiber material of this invention in the aforesaid section may have three spaces of a substantially similar shape at positions spaced from each other by an angle of about 120° or four spaces of a substantially similar shape at positions spaced from each other by an angle of about 90°. Each space may have a cross-sectional area not more than about 100 times, preferably not more than about 75 times, more preferably not more than about 10 times, that of the optical fiber.

The optical fiber materials of this invention have wrapping materials which have various outside shapes or traces of pressing sites reflecting the surface structures of the pressing surfaces of the press-bonding device or tool. For example, the outside surface of a pressed site which faces the inner surface of the wrapping material which tightly holds the optical fiber is substantially flat at least partly along the axis of the optical fiber. Or it may consist of two substantially flat surfaces extending along the axial direction of the optical fiber and a raised surface located between the two flat surfaces and extending in the axial direction of the optical fiber.

The wrapping material may tightly hold the optical fiber along its entire length in the axial direction of the optical fiber. Alternatively, the wrapping material may tightly hold the optical fiber at the central part of the wrapping material along the axis of the optical fiber and release the optical fiber from tight holding at both end portions of the wrapping material.

The wrapping material has a length of, for example, about 1 to about 100 mm in the axial direction of the optical fiber, and tightly holds the optical fiber over a length of about 1 to about 50 mm in the axial direction of the optical fiber.

In the first optical fiber material of this invention, the distance between two ends facing each other in the equatorial direction may, for example, be about 0.25 mm to about 5 mm in a section taken at right angles to the fiber axis. In the second optical fiber material of this invention, the maximum distance between two points where a phantom axis passing through the center of the optical fiber crosses the peripheral surface of the wrapping material in a section taken at right angles to the axis of the optical fiber may, for example, be about 0.25 mm to about 5 mm.

In the present invention, the optical fiber is made of, for example, quartz, multi-component glass, or a synthetic polymer. Any optical fiber may be used irrespective of the material of which it is made. Optical fibers made of the multi-component glass are disclosed, for example, in Japanese Patent Publication No. 29524/1976 and Japanese Laid-Open Patent Publication Nos. 3352/1978, 3354/1978 and 60240/1978, and optical fibers made of synthetic polymers are disclosed, for example, in Japanese Laid-Open Patent Publication No. 103504/1980.

The optical fiber preferably used in this invention is composed of a core and a clad and is substantially circular in a section taken at right angles to the fiber axis. It may have an outside diameter of, for example, about 50 to about 1,000 micrometers, preferably about 100 to about 600 micrometers.

The optical fiber materials of this invention have the wrapping material in at least one end portion, and the optical fiber has a convex surface, in the aforesaid at least one end portion. The convex surface is effective for efficient transmission and receiving of light by its lens effect.

Specific embodiments of the present invention will be described in greater detail with reference to the accompanying drawings.

Figure 2:
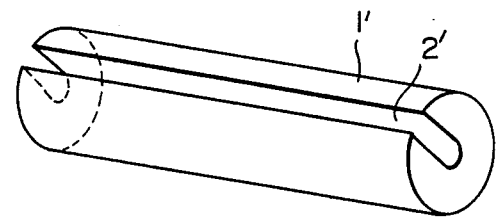
FIG. 2 is a perspective view of one example of a rod used in this invention.

FIGS. 1 and 2 respectively show an example of a pipe and a rod having an optical fiber insertion passage which is used in the first and second processes of this invention. FIG. 1 shows a pipe 1 having a circular outer cross-sectional shape having one passage 2 with a circular cross section for insertion of an optical fiber. FIG. 2 shows a rod 1' of a circular outer cross-sectional shape having one slit-like passage 2' with a U-shaped cross section.

Other examples of the pipe and rod used in the process of this invention will be easily understood from these examples taken in conjunction with the foregoing description.

Figure 3A:
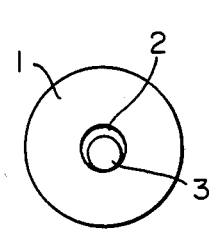
FIG. 3a is a schematic sectional view showing an optical fiber as it is inserted into a hollow passage formed in the pipe of FIG. 1.
Figure 3B:
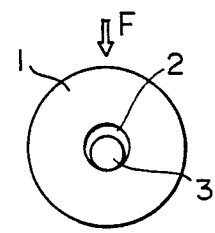
FIG. 3b is a schematic view for explaining the application of a force to a pipe in the state shown in FIG. 3a in one embodiment of this invention.
Figure 3C:
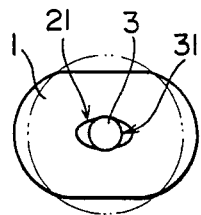
FIGS. 3c, 3d and 3e are schematic sectional views of one embodiment of the optical fiber material of this invention.
Figure 3D:
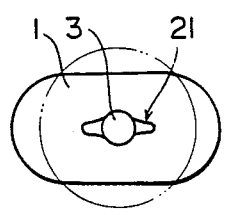
Figure 3E:
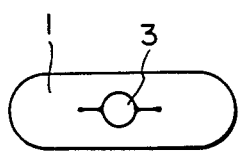

FIG. 3a shows an optical fiber 3 as it is inserted into the hollow passage 2 of the pipe 1 shown in FIG. 1. The hollow passage 2 is shown to have a space between its inside surface and the peripheral surface of the optical fiber 3. FIG. 3b is a schematic view showing the manner of applying a force to the pipe 1 in the state shown in FIG. 3a in accordance with the first process of this invention. FIGS. 3c, 3d and 3e show the axial section of the first optical fiber material of this invention in various stages during the performance of the process of this invention. With reference to FIGS. 3a, 3b, 3c, 3d and 3e, the first process of this invention will be specifically described.

The pipe 1 having the optical fiber 3 inserted in the hollow passage 2 (FIG. 3a) undergoes forces F and F' of quite the same magnitude directed in opposite directions in the meridian direction passing through the center of the optical fiber 3 (FIG. 3b). Upon application of the forces F and F' efficient to deform the pipe 1 plastically, the pipe 1 begins to be deformed, and as shown in FIG. 3c, the inner surface 21 of the passage 2 comes into contact with the peripheral surface of the optical fiber 3 in the meridian direction of the optical fiber 3. As the application of forces is continued, its deformation proceeds as shown in FIGS. 3d and 3e, and the space formed in the equatorial direction between the inner surface 21 of the passage 2 and the peripheral surface 31 of the optical fiber 3 becomes smaller than that shown in FIG. 3c. In the states shown in FIGS. 3c, 3d and 3e, the forces F and F' are applied by two substantially flat pressing surfaces (not shown), and the outside surface of the deformed pipe 1 in the meridian direction is substantially flat.

Figure 4A:
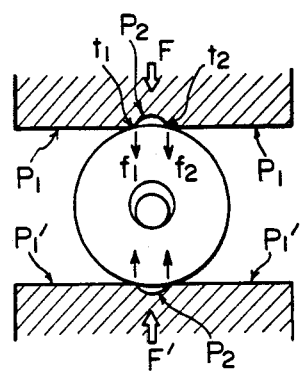
FIG. 4a is a schematic view for explaining the application of a force to a pipe in the state shown in FIG. 3a by a pressing surface having a groove in an embodiment different from that shown in FIG. 3b.
Figure 4B:
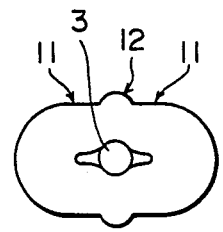

FIG. 4a schematically illustrates pressing surfaces respectively having substantially flat surfaces $P_1$ and $P_1'$ and centrally located curves surfaces $P_2$ and $P_2'$ extending axially of the pipe as they are in contact with the pipe 1 in the state shown in FIG. 1. It will be seen that in this case, forces F and F' are first applied to the pipe 1 as forces $f_1$ and $f_2$ at sites $t_1$ and $t_2$ of contact between the pressing surfaces and the pipe 1 in a direction parallel to the meridian direction of the optical fiber. When the two pressing surfaces $P_1$ and $P_1'$ further move toward each other from the state shown in FIG. 4a, the pipe 1 begins to be deformed, and in the same way as shown in FIG. 3c, the inner surface of the passage 2 and the outside surface 31 of the optical fiber 3 contact in the meridian direction of the optical fiber 3. Finally, as shown in FIG. 4b, there is obtained the first optical fiber material of this invention provided in the meridian direction with an outside surface having axially extending flat portions 11 and an axially extending raised portion 12, which reflect the surface structure of the pressing surfaces $P_1(P_1')$ and $P_2(P_2')$, leaving minute spaces in the equatorial direction.

The groove in the pressing surfaces shown in FIG. 4a is semi-circular in its section taken at right angles to the axial direction, but may be in other shapes, for example, a shallow semicircular shape, a U-shape or a polygonal shape such as a triangular shape. The width of the groove in a direction at right angles to the axial direction (the width of an open portion) is preferably larger than the diameter of the optical fiber.

Figure 5B:
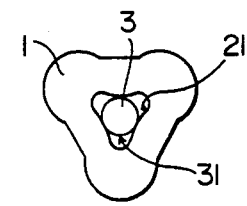
FIGS. 5b, 5c and 5d are schematic sectional views of another embodiment of the optical fiber material of this invention.
Figure 5A:
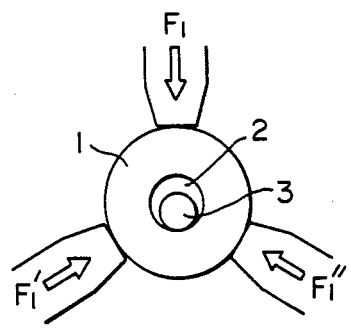
FIG. 5a is a schematic view for explaining the application of a force to a pipe in the state shown in 3a in another embodiment of this invention.
Figure 5C:
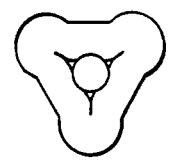
Figure 5D:

FIG. 5a illustrates the manner of applying forces to the pipe 1 in the state shown in FIG. 3a from three directions spaced from each other by an angle of 120°. in accordance with the second process of this invention. FIGS. 5b, 5c and 5d illustrate the section of the second fiber material of this invention in a direction at right angles to the axial direction at various stages of performing the second process of this invention. The second process will now be specifically described with reference to FIGS. 5a, 5b, 5c and 5d.

A pipe 1 having an optical fiber 3 inserted in its hollow passage 2 undergoes forces $F_1$, $F_1'$ and $F_1''$ of the same magnitude directed toward the central part of the optical fiber 3 from three sites of its peripheral surface (FIG. 5a). Upon the application of forces $F_1$, $F_1'$ and $F_1''$ which are large enough to deform the pipe 1 plastically, the pipe 1 begins to be deformed, and as shown in FIG. 5b, the inner surface 21 of the passage 2 makes contact with the peripheral surface 31 of the optical fiber 3 at those parts of the inner surface 21 on which the forces are exerted. As the application of the forces continue the deformation of the pipe proceeds to the state shown in FIG. 5c and further to the state shown in FIG. 5d, and the spaces formed between the peripheral surface 31 of the optical fiber 3 and the three sites of the inner surface 21 of the pipe passage which are spaced from each other by 120° become smaller than in the state shown in FIG. 5b. The states shown in FIGS. 5b, 5c and 5d are produced by applying the forces $F_1$, $F_1'$ and $F_1''$ by three substantially flat pressing surfaces, and the pressed sites of the outside surface of the deformed pipe 1 are substantially flat.

Figure 6A:
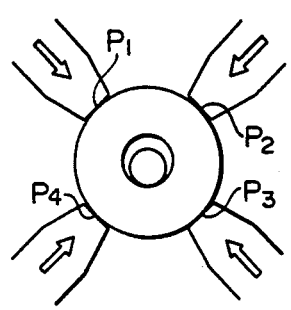
FIGS. 6a and 7a are respectively schematic view for explaining the application of a force to a pipe in the state shown in FIG. 3a by different pressing members having four pressing surfaces.

FIG. 6a schematically shows substantially flat pressing surfaces $P_1$, $P_2$, $P_3$ and $P_4$ which are brought into contact with the pipe 1 in the state shown in FIG. 3a in accordance with the second process of the present invention. It will be appreciated that in this case, the four forces are first applied to the pipe 1 from the contacting sites between the pressing surfaces and the pipe 1 toward the center of the optical fiber in four directions which are spaced from each other by 90°.

Figure 6B:
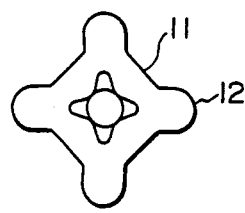
FIGS. 6b and 7b are schematic sectional views of the optical fiber materials of this invention obtained by the processes shown in FIGS. 6a and 7a, respectively.

When the four pressing surfaces $P_1$, $P_2$, $P_3$ and $P_4$ move in the direction in which they approach each other further from the state shown in FIG. 6a the pipe 1 begins to be deformed, and in the same way as shown in FIG. 5b, the inner surface 21 of the passage 2 comes into contact with the outside surface 31 of the optical fiber 3 in the meridian and equatorial directions of the optical fiber 3. Finally, as shown in FIG. 6b, there is obtained the second optical fiber material of this invention having an outside surface with four flat pressed portions 11 and four raised portions 12 both extending in the axial direction and reflecting the surface structures of the four pressing surfaces $P_1$, $P_2$, $P_3$ and $P_4$, leaving minute spaces between the pipe and the fiber in the two directions in which the forces have been applied.

Figure 7A:
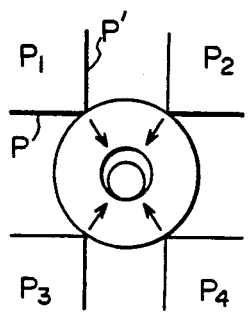

FIG. 7a shows four pressing members $P_1$, $P_2$, $P_3$ and $P_4$ each having an angled pressing surface P,P' which are in contact with the pipe 1 in the state shown in FIG. 3a in accordance with the second process of this invention. In this case, a set of the pressing members $P_1$ and $P_2$ and a set of the pressing members $P_3$ and $P_4$ move in opposite directions relative to each other. Hence, the forces directed toward the center of the optical fiber are balanced between the vector component from the pressing member $P_1$ and the vector component from vector component from the pressing member $P_4$ and between the vector component from the pressing member P$_2$ and the vector component from the pressing member P$_3$.

Figure 7B:
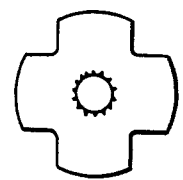

When the pressing members further move in such directions that the pressing members P$_1$ and P$_2$ approach the pressing members P$_3$ and P$_4$, the pipe 1 begins to be deformed, and as shown in FIG. 7b, for example, the inner surface 21 of the passage 2 is collapsed complexly as a whole. It will be easily understood that the product shows the pressed parts illustrated in FIG. 7b.

Figure 8:
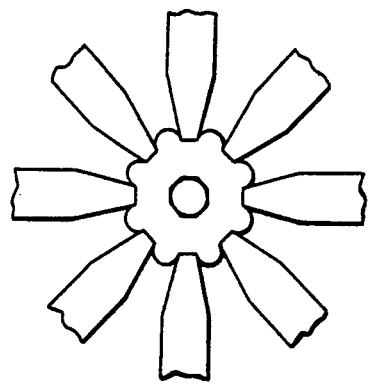
FIG. 8 is a view showing the application of a force to a pipe in the state shown in FIG. 3a by eight pressing surfaces.

FIG. 8 shows the pressing of the pipe 1 in the state shown in FIG. 3a by eight pressing surfaces pressing members.

From FIGS. 5 to 8 and the foregoing description, one will be able to understand fully that an optical fiber is held tightly by pressing a pipe or rod having the optical fiber inserted in it with forces applied at three or more sites in accordance with the second process of this invention.

Figures 9A, 9B:
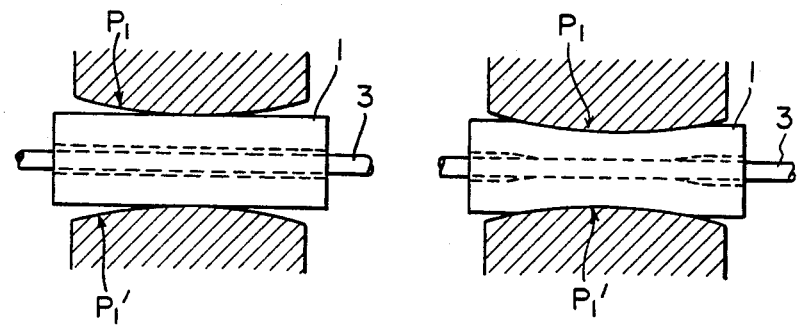

FIG. 9a schematically shows pressing surfaces P$_1$ and P$_1$' having a gentle convex surface in the axial direction of the pipe 1 which are in contact with the central part of the pipe 1 in its axial direction. When the pressing surfaces P$_1$ and P$_1$' approach each other further from the state shown in FIG. 9a, the pipe 1 and the passage 2 begin to be deformed at the central part of the pipe 1 in the axial direction and the deformation gradually proceeds towards the ends of the pipe.

Figure 10:
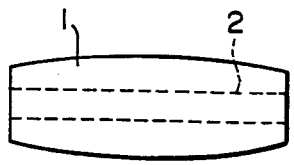
FIG. 10 is a schematic side elevation of another example of the rod used in this invention.

It will be understood from the embodiment shown in FIGS. 9a and 9b that the forces on the central part, taken axially of the pipe or rod, of the peripheral surface of the pipe or rod in its axial direction are exerted earlier than the forces on the end portions of its peripheral surface. Such application forces may also be effected on a pipe or rod of the type shown in FIG. 10 which has a larger outside diameter at its center than at its both end portions.

Figure 11:
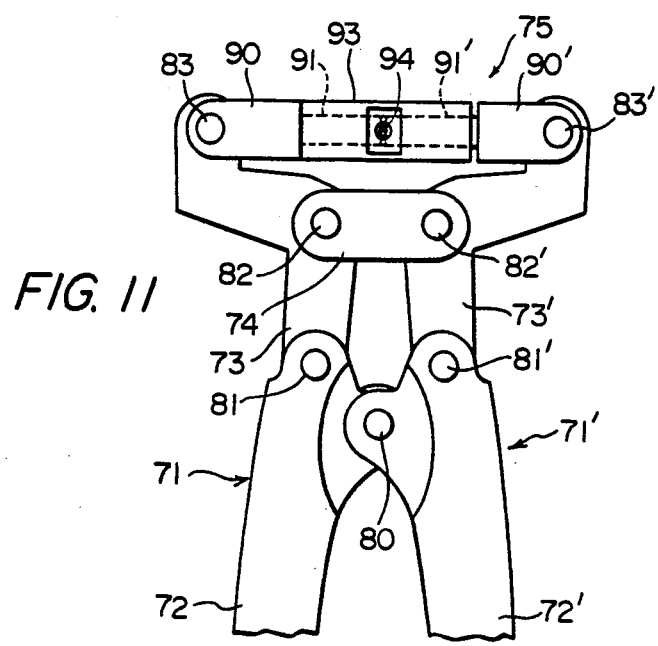
FIG. 11 is a top plan view showing one example of the press-bonding device or tool of this invention.
Figure 12:
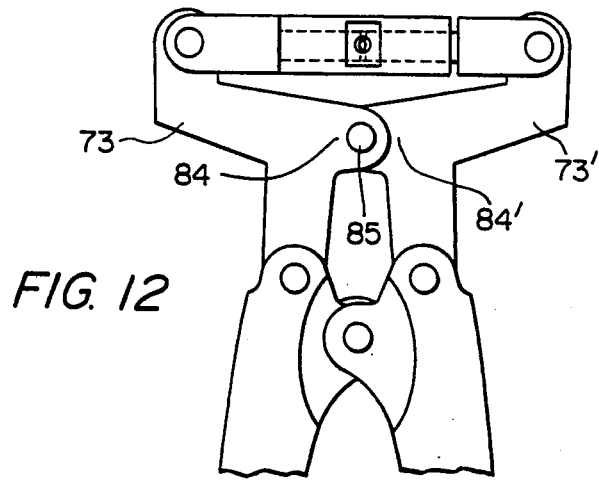
FIG. 12 is a sketch showing a different mode of connection of the arms of the bonding device or tool of this invention from that shown in FIG. 11.

FIG. 11 shows one example of the first press-bonding device or tool that can be used in this invention to press the wrapping material on an optical fiber. A pair of handles 72 and 72' are connected pivotally to levers 73 and 73' by pins 81 and 81'. The levers 73 and 73' and the handles 72 and 72' connected by the pins 81 and 81' form a pair of arms. The handles 72 and 72' are connected to each other pivotably by a pin 80, and the levers 73 and 73' are connected to each other by a lever supporting member 74 and pins 82 and 82'. The levers 73 and 73' can pivot respectively on the pins 82 and 82'. As shown in FIG. 12, the levers 73 and 73' may also be pivotably connected by providing linking portions 84 and 84' in the levers 73 and 73' and connecting them by a pin 85 at the linking portions instead of using the lever supporting member 74.

It will be appreciated therefore that an arm 71 comprised of the lever 73 and the handle 72 and an arm 71' comprised of the lever 73' and the handle 72' constitute a pair of arms.

A pressing member 75 is pivotably connected to one end of the lever 73 and one end of the lever 73' by pins 83 and 83' respectively. The pressing member 75 is comprised of base portions 90 and 90', pressing portions 91 and 91' fixed respectively to the base portions 90 and 90' and having pressing surfaces 92 and 92', and a guide member 93. The guide member 93 has an opening 94 for supplying a pipe or rod having an optical fiber inserted in it between the pressing surfaces 92 and 92'. The guide member may, for example, be a cylinder, in which case the pressing portions 91 and 91' may, for example, be pistons slidable longitudinally within the passage of the cylinder. The cylinder 93 may define the relative movement of the pistons 91 and 91' only on a common axis in slidable relation to both of the pistons 91 and 91', or in fixed relation to one of the pistons 91 and 91' and slidable relation to the other.

Figure 13:
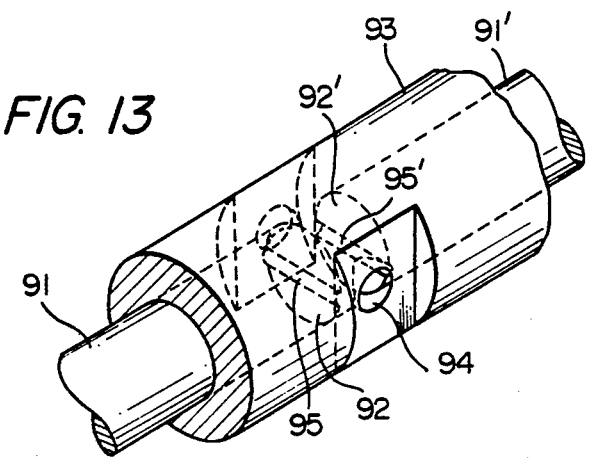
FIG. 13 is an enlarged perspective view of an opening portion in the device or tool shown in FIG. 11.

FIG. 13 shows the opening 94 of FIG. 11 in an enlarged perspective view. It will be understood from FIG. 13 that the pressing surfaces 92 and 92' respectively have grooves 95 and 95', and the pipe or rod having the optical fiber inserted in it can be very easily positioned between the pressing surfaces 92 and 92' within the opening 94.

The press-bonding device or tool shown in FIG. 11 can be operated by positioning the pipe or rod having the optical fiber inserted in it between the pressing surfaces 92 and 92' in the opening 94 and causing the handles to approach each other by, for example, grasping it. Approaching of the handles 72 and 72' to each other produces a pivoting motion. The pivoting motion is transmitted to the levers 73 and 73' through the pins 81 and 81'. The levers 73 and 73' then pivot on the pins 82 and 82' and transmit their pivoting motion to the pressing member 75 through the pins 83 and 83' to cause the pressing surfaces 92 and 92' to approach each other. Consequently, the pipe or rod positioned between the pressing surfaces 92 and 92' is pressed by the pressing surfaces 92 and 92' in the meridian direction or a direction parallel to it in that section of the optical fiber in the pipe or rod which is taken at right angles to the fiber axis to give the first optical fiber material of this invention.

It will be understood that the first optical fiber material of this invention having the crosssectional shape shown in FIG. 6b is obtained by using the first press-bonding device or tool of this invention having pressing surfaces 92 and 92' with the grooves 95 and 95'.

Figure 14:
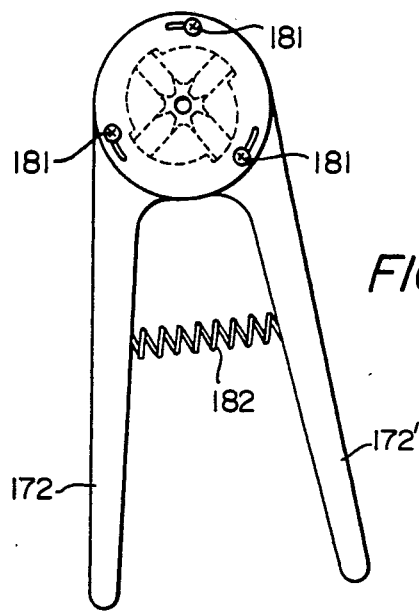
FIG. 14 is a top plan view showing another example of the bonding device or tool of the invention.
Figure 15:
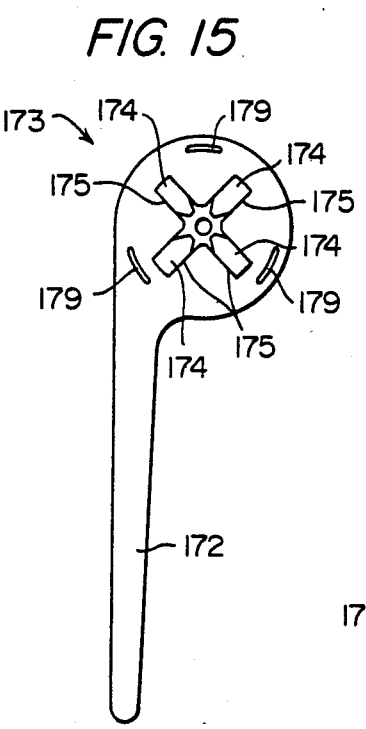
FIGS. 15, 16 and 17 are sketches showing different component parts of the bonding device or tool shown in FIG. 14.
Figure 16:
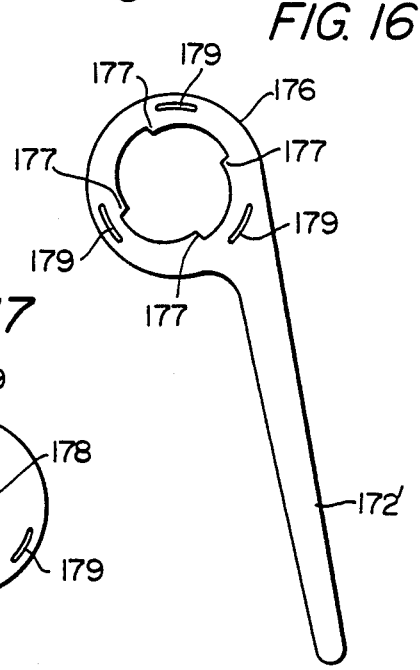
Figure 17:
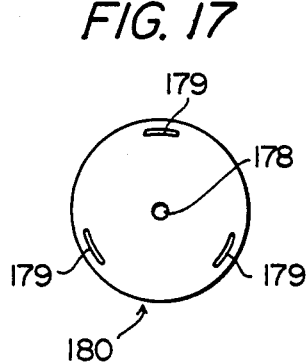

FIG. 14 shows one example of the second press-bonding device or tool which can be used in this invention to press the wrapping material on an optical fiber. FIGS. 15, 16, and 17 shows the component parts of the device of tool of FIG. 14 in the disassembled state.

FIG. 15 shows a pressing mechanism 173 formed as a unit with one handle 172 in a top plan view. The pressing mechanism 173 has guide grooves 175 receiving pressing members 174 and defining their moving direction. In the embodiment shown in FIG. 15, four guide grooves 175 exist. It is sufficient, however, that at least three guide grooves 175 exist symmetrically with respect to a rotating axis.

FIG. 16 shows a cam mechanism 176 formed as a unit with the other handle 172' in a top plan view. The cam mechanism 176 is provided with eccentric cams 177.

In FIG. 15, the pressing members 174 are held within the guide grooves 175 to the wall of the pressing mechanism 173 by a spring, and adapted to return to predetermined positions after holding the optical fiber tightly.

The pressing mechanism 173 of FIG. 15 and the cam mechanism 176 of FIG. 16 are combined in the state shown in FIG. 14, and the back of the cam mechanism 176 is covered with a closure member 180 having an opening 178 for insertion of the wrapping material on the optical fiber. Surface grooves 179 provided in the component parts are arranged in position and pins 181 are inserted into the grooves 179 to build the second press-bonding device or tool shown in FIG. 14. The tool shown in FIGS. 14 is provided with a spring 182. According to the tool shown in FIG. 14, the wrapping material having the optical fiber inserted in it is inserted into the pressing mechanism 173 and the cam mechanism 176 through the opening 178, and then the handles 172 and 172' are grasped so as to cause them to approach. As a result, the rotating motion of the cam mechanism 176 is converted to a motion tending in a direction in which the pressing members 174 approach each other in the guide grooves 175, and the wrapping material is pressed by pressing surfaces 174' of the pressing members 174 to give the second optical fiber material of this invention.

In the optical fiber materials of this invention, the optical fibers are held tightly by the wrapping materials by very simple means. Since in the optical fiber materials of this invention, the optical fibers are protected accurately from forces which may be applied in the axial direction of the fibers and in a direction at right angles to the fiber axis, the application of optical fibers in various uses can be greatly extended. One example of application is illustrated in FIG. 18 which shows the first or second optical fiber material of this invention incorporated in an optical connector plug.

Figure 18:
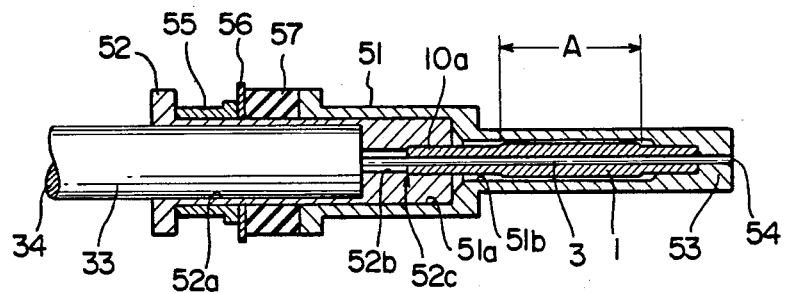
FIG. 18 is a sectional view of one example of an optical connector plug built by using the optical fiber material of this invention.

With reference to FIG. 18, an optical connector plug 50 is provided with a ferrule 51 and a holder 52. The ferrule 51 is fabricated in a stepped hollow cylinderical shape and includes a large-diameter hole portion 51a adapted to receive the holder 52 in tight fit and a small-diameter hole portion 51b for insertion of the optical fiber material of the invention. It also has at its end portion a hole 54 for insertion of an optical fiber 3. The optical fiber material of this invention composed of the optical fiber 3 and the wrapping material 1 is fitted in the small-diameter hole portion 51b at a portion A where the optical fiber is tightly held by the wrapping material. That part of the optical fiber 3 which projects slightly from one end of the wrapping material 1 is inserted in the hole 54 of the end portion 53 of the ferrule 51.

The holder 52 has a nearly hollow-cylindrical shape and includes a large-diameter hole portion 52a for insertion of an optical fiber cable (composed of the optical fiber 3 and a flexible coating 34 thereon) and a small-diameter hole portion 52b for receiving the end portion 10a of the wrapping material and fixing it there. The small-diameter hole portion 52b is of a stepped structure, and fixes the end portion 10a of the wrapping material by a step 52c.

The optical-connector plug 50 of FIG. 18 may be built by removing the flexible coating 34 from one end portion of the optical fiber cable 33 over a predetermined length, putting the large-diameter hole portion 52a of the holder 52 over the cable 33 in the manner shown in FIG. 18, putting a pipe or rod (i.e., a wrapping material) having a fiber insertion passage over the uncovered optical fiber 3, advancing the wrapping material until it abuts against the step 52c of the small-diameter hole portion 52b of the holder 52, thereafter pressing a portion having a length A of the wrapping material 1 by the process of this invention to hold the optical fiber tightly by the wrapping material, mounting a collar 55, a washer 56 and a cushion 57 on the holder 52, then applying the ferrule 51 until its large-diameter hole portion 51a is received tightly by the holder 52 and its smalldiameter portion receives the wrapping material in tight fit, and finally polishing that end portion of the uncovered optical fiber which slightly projects from the nozzle 54 to form it into a mirror surface.

Figure 19:
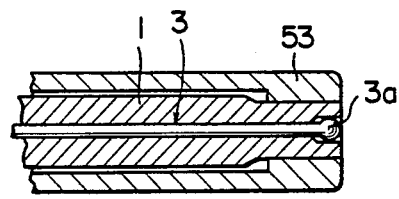
FIG. 19 is a sectional view of the forward end portion of an optical connector plug built by using the optical fiber material of this invention whose end is processed into a spherical shape.

In another embodiment of the optical connector plug using the optical fiber material of this invention, the end portion of the optical connector plug is formed, for example, as shown in FIG. 19. In the embodiment of FIG. 19, the end portion of the optical fiber 3 is processed into a spherical shape. The processing can be easily carried out by melting the end portion of the optical fiber. An optical fiber made from a multicomponent glass can be very easily processed in this manner. The optical fiber material of this invention having a spherical end has a great effect of converging light beams released from its end portion by the lens action of its convex surface, and can advantageously minimize losses of optical signals.

What is claimed is:

1. An optical fiber termination comprising an optical fiber and a termination member of predetermined length formed integrally of plastically deformable material in an initially substantially cylindrical shape, an end portion of said optical fiber being received within an axial passage of said termination member to thereby surround an outer peripheral surface of the end portion of the optical fiber for said predetermined length, said termination member being plastically deformed to partly contact the outer peripheral surface of said optical fiber in a manner that said termination member is in tight fitting contact with at least two separate peripheral outer surface portions of said optical fiber along at least a central portion of said member's predetermined length, said contacted peripheral outer surface portions of the optical fiber being disposed substantially symmetrical to each other with respect to the axis of the optical fiber and being separated from each other by spaces between the termination member and the optical fiber, said spaces being disposed substantially symmetrical to each other with respect to the fiber axis, thereby achieving tight fitting contact between said plastically deformed termination member and said peripheral outer surface portions of the optical fiber.

2. An optical fiber termination according to claim 1 wherein the deformed termination member contacts two separate peripheral outer surface portions of the end portion of the optical fiber which are disposed substantially symmetrical to each other with respect to the fiber axis, the mid-points of said contacted surface portions being about 180 degrees apart, said contact occuring along the meridian direction of a cross-section of the optical fiber, said contacted surface portions being separated by two spaces between the termination member and optical fiber located at opposite sides of the optical fiber in the equatorial direction of said cross-section of the optical fiber.

3. An optical fiber termination according to claim 1 wherein the deformed termination member contacts at least three separate peripheral outer surface portions of the end portion of the optical fiber, said contacted surface portions being substantially symmetrical to each other with respect to the fiber axis, the mid-points of said contacted surface portions being separated from the mid-points of adjacent contacted surface portions by substantially the same angular displacement about the fiber axis, said contacted surface portions being separated from each other by at least three spaces between the termination member and the optical fiber, said spaces being separated by the same angular displacement as the mid-points of adjacent contacted surface portions.

4. An optical fiber termination according to claim 1 wherein said termination member is plastically deformed only along said central portion of its predetermined length, said termination member remaining substantially non-deformed at each end, said termination member being in tight fitting contact with said separate peripheral outer surfaces portions of the optical fiber only along the plastically deformed central portion, the outer peripheral surface of said optical fiber remaining substantially free of tight fitting contact with said non-deformed ends of said termination member.

5. An optical fiber termination according to claim 4 wherein said central portion is deformed progressively toward the mid-point of the termination member length.

6. An optical fiber termination according to claim 4 wherein said termination member has an outer diameter which at least initially is larger at the mid-point of the termination member length than at either end.

7. An optical fiber termination according to claim 1 wherein said plastically deformable material is a metal selected from the group of copper, zinc, lead, aluminum or alloys containing these metals, and wherein said optical fiber is made from quartz or multi-component glass and has a core and a cladding.

8. An optical fiber termination according to claim 1 wherein said plastically deformable material is a synthetic resin, and wherein said optical fiber is made from quartz or multi-component glass and has a core and a cladding.

9. An optical fiber termination according to claim 1 wherein said end portion of the optical fiber has end face formed into a convex surface.

10. An optical fiber termination according to claim 2 wherein said termination member has outer peripheral surface portions corresponding to the contacted surface portions of said optical fiber which are substantially flat.

11. An optical fiber termination according to claim 10 wherein each of said flat outer surface portion of the termination member has a raised central portion which extends axially along at least the central portion of the length of said termination member.

12. An optical fiber termination according to claim 3 wherein said termination member has an outer peripheral surface which is deformed inwardly at least three locations corresponding to the contacted peripheral surface portions of said optical fiber, said inwardly deformed locations having the same symmetrical alignment about the fiber axis as said contacted surface portions.

13. An optical fiber termination according to claim 2 wherein said termination member has an outer peripheral surface with n flat surfaces (where n 1) which are symmetrical to each other about the optical fiber axis with respect to a 360/n degree rotating axis.

14. An optical fiber termination according to claim 12 wherein said inwardly deformed locations extend along at least the central portion of the termination member's length.

15. An optical fiber termination according to claim 12 wherein said inwardly deformed locations are substantially L-shaped in cross-section.

16. An optical fiber termination according to claim 15 wherein said L-shaped locations extend as L-shaped grooves in the outer peripheral surface of the termination member along the central portion of the termination member's length.

* * * * *